United States Patent [19]

Ma

[11] Patent Number: 4,758,349
[45] Date of Patent: Jul. 19, 1988

[54] SEPARATION PROCESS FOR BIOLOGICAL MEDIA

[76] Inventor: Hsien-Chih Ma, 15 Hawkins Ave., Parsippany, N.J. 07054

[21] Appl. No.: 25,066

[22] Filed: Mar. 12, 1987

[51] Int. Cl.$^4$ ............................................. B01D 15/08
[52] U.S. Cl. .................................... 210/672; 210/676; 210/677; 210/264; 210/267; 435/183; 435/815
[58] Field of Search ............... 210/672, 677, 806, 267, 210/656, 659, 675, 676, 189, 190, 191, 198.2, 264, 269, 258; 435/183, 288, 299, 312, 815

[56] References Cited

U.S. PATENT DOCUMENTS

| | | | |
|---|---|---|---|
| 2,617,986 | 11/1952 | Miller | 210/267 X |
| 3,971,842 | 7/1976 | Ewbank | 210/267 X |
| 4,031,155 | 6/1977 | Healy et al. | 210/672 X |
| 4,144,130 | 3/1979 | Kula et al. | 195/66 R |
| 4,347,327 | 8/1982 | Lee et al. | 521/28 |
| 4,350,767 | 9/1982 | Zimmermann et al. | 435/183 |
| 4,472,203 | 9/1984 | Miyahara et al. | 210/672 X |
| 4,522,720 | 6/1985 | Berry et al. | 210/806 X |
| 4,560,661 | 12/1985 | Katsumata et al. | 435/183 |

*Primary Examiner*—Tom Wyse
*Attorney, Agent, or Firm*—Kenyon & Kenyon

[57] ABSTRACT

A continuous industrial separation process for biopolymer extracts each individual single component from a stream of cell extract. The process can be set up as a mixed flow reactor or fluidized bed in a continuous operation under normal pressure to treat a volume of cell extract in a short period of time. The separated single biopolymer is continuously withdrawn from the process and be easily condensed into the desired concentration. A resin, which can be an ion exchanger or affinity adsorbent or dye ligand adsorbent or hydrophobic adsorbent or immunoadsorbent, is evenly suspended in a well mixed reactor to equilibrate with the biopolymers in the liquid phase. The fundamental separation scheme is successive adsorption and desorption of biopolymer from liquid. Biopolymers are isolated into a single stream or multistreams for one component or many individual components. Each stream contains only one high purity biopolymer. The new process has the advantages of short operation time and economical usage of resin and high production throughput for treating massive volumes of cell extract in a continuous mode.

12 Claims, 4 Drawing Sheets

SEPARATION PROCESS FOR BIOLOGICAL MEDIA

BACKGROUND OF THE INVENTION

1. Technical Field

The present invention relates to a method and apparatus for separating a desired component from a solution containing a plurality of biochemical components, and particularly to a method and apparatus using selective adsorption and desorption to accomplish such separation.

2. Description of the Prior Art

Biomolecules can be produced by industrial processes that involve the use of biological systems, principally fermentation, followed by downstream processing which includes the subsequent recovery and purification of desirable products.

Methods for removal or separation of undesirable materials for biological extracts are well known. A current survey of available methods can be found in Volume XXII of "Methods in Enzymology" pp. 273–287 and pp. 476–556 (ed. W. E. Jakoby, Academic Press, New York, N.Y.).

Precipitation is one of the oldest methods for recovering and purifying proteins, and it is still commonly used today. Precipitative methods are based on the physical and chemical properties of the proteins in solution and are effected by changing the solution environment. The four precipitation methods which are most widely used are salting-out, precipitation by organic solvents, isoelectric precipitation, and precipitation by polymers.

The precipitated protein particles can be separated from the aqueous solution by a centrifuge operation or by filtration with a filter press or a rotary drum filter. One of the main factors influencing process economics is the size of the particles to be separated. When the particle size is lower than the 1–2 u range, or about the size of *E. coli*, the conventional filtration and centrifuge operations are replaced by other techniques.

Among the most rapidly advancing areas for biological separation of small particles are the permeable membrane techniques. There are four types of membrane-based separation techniques: microfiltration, ultrafiltration, hyperfiltration or reverse osmosis, and electrodialysis. They are classified according to the partical size to be removed from a solution.

Another important separation technique for protein mixtures is electrophoresis. Separation by this technique depends on the mobility of protein molecules in gel in an applied electric field. It has been widely used as an analytical technique but is not suitable for large-scale separation. There are three electrophoretic methods—simple electrophoresis, isoelectric focusing and isotachophoresis—which have been primarily aimed at improved analysis of protein mixtures.

The most widely used methods for biological separation are based on adsorption. Column chromatography has been used as an analytical tool to identify small quantities of biomolecules and has been scaled up for purifying commercial quantities of these compounds. A description of chromatographic methods is summarized in the "Encyclopedia of Chemical Technology", Volume 5 pp. 418–420 (Kirk Othmer, 2nd Ed. Wiley-Interscience, New York, N.Y.).

Chromatography is conventionally carried out by flowing a fluid through a packed column. The selected packing is usually in the form of spherical beads as the stationary solid phase in the column. As the fluid flows through the column, the desired biological products and impurities in the fluid phase interact differently with the packing to effect the separation. The interaction can be based on the chemical and physical properties of biological products, such as size, ionic charge, configuration, polarity or solubility, which leads to the differences among the various types of chromatography.

The five main types of chromatography in common use today are gel filtration, ion exchange, adsorption, affinity and reversed phase.

Gel filtration chromatography separates biomolecules on the basis of size. The principle is that small molecules will penetrate the pore structure of the beads to a greater extent than larger molecules will, and therefore will experience a longer retention time in the beads. In effect, the small molecules are hindered as they move through the packed column, allowing large molecules to come out first. This technique is also used for desalting or solvent removal. Sephadex gel, made by Pharmacia Chemicals, and Ultrogel by LKB can fractionate biomolecules in the molecular weight range from 300 to 50,000,000.

Ion exchange chromatography is the most widely used chromatographic technique for purification of biological products. It separates biomolecules based on the ionic charge between the biomolecules and the solid particles. This charge can be controlled by the pH and ionic strength of a solution. As the liquid phase flows through the column, the biomolecules with a net charge opposite to the charge on the ion exchange beads will bind to the beads. The higher the net charge, the stronger the binding interaction will be. Biomolecules that are neutral, or that carry a charge similar to the charge on the ion exchange beads, will flow out of the packed column with the liquid phase. The bound biomolecules are then dislodged from the ion exchange beads as the pH and ionic strength of the liquid phase are varied. A large variety of types of ion exchange beads have been developed with cellulose, agarose, dextran or synthetic polymer as their bases. Carboxy methyl group and phospho group are attached to the base beads to from cation exchangers. Diethylaminoethyl group, triethylaminoethyl group and diethyl-2-hydroxy propyl aminoethyl group are most commonly used as anion exchangers.

Adsorption chromatography separates biomolecules on the basis of chemical-physical adsorption of the biomolecules to a substrate attached to the solid beads. For example, hydroxyapatite crystals immobilized in a cross-linked agarose gel, HA-Ultrogel by LKB, can be used to fractionate nucleic acid, steroids and phospholipids very similar in molecular weight or charge density.

Affinity chromatography is one of the most promising chromatographic techniques because it offers tremendous resolving power. The separation is based on a biospecific interaction. A ligand, designed specifically for the biomolecules of interest, is attached to the affinity support media usually through a spacer arm. The spacer arm provides flexibility and space within the gel matrix, and helps to provide steric configuration during the binding. Biomolecules such as enzyme, antibody, antigen and hormone have been separated or purified by this technique.

Reversed phase chromatography is a powerful technique in the purification of smaller biomolecules including peptides, nucleotides and amino acids. The solid beads, with a rigid, microparticulate structure of large pore volume, are saturated with appropriate hydrocarbons. The biomolecules in the liquid phase flowing through the packed column are dissolved in the supported hydrocarbons according to hydrophobicity. The least soluble biomolecules would come out of the column first and the most soluble ones would elute the column last. Thus, the separation can be achieved as the protein mixtures/fluid flows through the whole column.

All of the conventional separation processes described above are more suited for analytical and preseparation batch processes. They cannot readily meet the demand for high efficiency mass purification. Increasing the size of columns for industrial purification purposes ends up with high equipment and maintenance cost but limited efficiency.

SUMMARY OF THE INVENTION

A principal object of the present invention is to provide a method and a corresponding apparatus for continuously and automatically separating a single active component from a stream after fermentation or similar biochemical process.

It is a further object of the invention to provide a method and apparatus in which sequential adsorption and desorption steps are performed selectively in a bed of adsorbent material at separate stations.

Another object of the invention is to provide a method and apparatus for separating a component from a biochemical stream that provide for continuous recycling of process liquids and adsorbent material.

The above and other objects are accomplished by a method for separating a desired component from a solution containing a plurality of biochemical components, the method comprising:

(a) mixing an amount of said biochemical solution with a first buffer solution having a predetermined capability for promoting adsorption of at least one of the plurality of biochemical components in the amount of biochemical solution by the granular particles, the amount of biochemical solution being selected so that the at least one of the biochemical components will be substantially completely adsorbed by the predetermined amount of granular adsorbent particles;

(b) delivering the mixture to a container containing a predetermined amount of granular adsorbent particles and located at a first station;

(c) draining the first buffer solution from the container while retaining the granular adsorbent particles in the container;

(d) moving the container to a second station spaced from the first station;

(e) delivering a second buffer solution to the container, the second buffer solution having a predetermined capability for selectively desorbing a desired one of the at least one of the adsorbed biochemical components from the granular particles;

(f) draining the second buffer solution containing the desired biochemical component from the container while retaining the granular adsorbent particles in the container;

(g) returning the container to the first station;

(h) saving the drained second buffer solution containing the desired biochemical component as a product stream; and (i) repeating steps (a) through (h).

Preferably, the container is a first one in an endless line of containers, and all containers are moved simultaneously and sequentially through the successive stations.

The objects of the invention are further accomplished by an Apparatus for separating a desired component from a solution containing a plurality of biochemical components, the apparatus comprising:

an endless conveyor;

a plurality of containers holding predetermined amounts of granular adsorbent material and arranged in equally spaced positions along the length of the conveyor, each container having an upper end with an inlet opening and a lower end with an outlet opening;

means for intermittently advancing each container on the conveyor successively through a plurality of stations having the same spacing as the spacing between the containers;

means for delivering a liquid to each container in succession at a first one of said stations;

means for delivering a separate stream of preselected liquid material to the inlet opening of each container in succesion at each of the rest of the plurality of stations;

means for collecting a separate stream of liquid from the outlet opening of each container in succession at each of the plurality of stations, said collecting means including means for maintaining the streams collected from the container at the first station separate from the streams collected from the containers at the rest of the stations; and a porous cover provided for the outlet opening of each container as the containers advance through the plurality of stations for permitting drainage of liquid through the outlet opening while retaining granular particles in the container.

The solid phase of adsorbent particles can consist of an ion exchange resin, affinity resin, reverse phase resin, or normal phase resin, with the liquid phase being stirred and well mixed with the solid particles. The mechanisms of mass transfer between the two phases can be based on adsorption-desorption of ion exchange, affinity, reverse phase, or normal phase resin. The process is completely efficient in using solid and liquid phases, i.e., a resin and a buffer. In general, the new process operates at normal pressure, has low equipment construction and maintenance costs, and exhibits high efficiency. The apparatus can be flexibly designed and easily scaled up or down to handle various volume rates and concentrations of bio-active materials. The process is not affected by changes in flow rate and dimensions of the reactor. The low pressure operation, full usage of solid and liquid phases, flexibility in design, continuous and highly efficient operation, and low construction and maintenance costs are the advantages over the conventional single-column chromatography process. Generally, the separation achieved by analytical and/or production scale chromatographic columns can be easily transferred to the equipment and new methodology of the invention with the same solid phase particles and liquid phase systems.

BRIEF DESCRIPTION OF THE DRAWINGS

The above and other objects, features, and advantages of the invention will be more readily understood from the following detailed description, taken with the drawings in which.

DETAILED DESCRIPTION OF THE PREFERRED EMBODIMENTS

In the general case, the feed solution to be separated by the process and apparatus of the invention will include a desired biomolecular component mixed with impurities that can be categorized into two groups, according to their order of appearance at the outlet of a conventional chromatography column. The first group consists of impurities that are eluted before the desired component and the second group consists of impurities that are eluted after the desired component.

Figure 1:
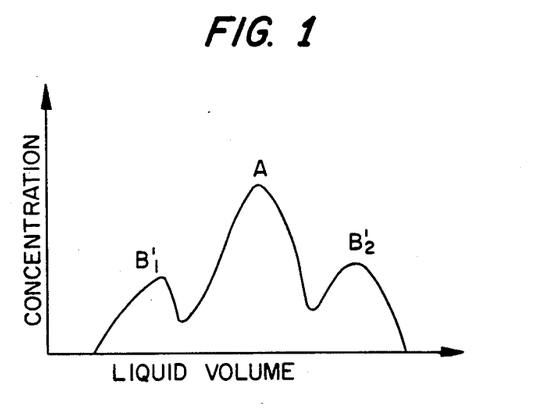
FIG. 1 is a chromatographic elution diagram for a typical biomolecular mixture in which the elution curve for a desired component A is overlapped by the curves for two groups of impurities $B_1$ and $B_2$.

FIG. 1 is a typical elution diagram for a chromatographic column for the generalized case of a biomolecular mixture in which the curve for a desired component A overlaps the curves for first and second groups of impurities $B_1$ and $B_2$. In an elution diagram, the concentration of the components of a feed solution are plotted as a function of the cumulative volume of liquid collected at the outlet of a chromatographic column. Thus, in FIG. 1, the first component, or group of components, to appear is identified by $B_1$. This group is followed by the desired component A, which in turn is followed by a second component, or group of components $B_2$. In this typical case, the impurity groups $B_1$ and $B_2$ overlap the desired component A, making it difficult to separate the desired component from the impurities. Such separation is possible with the process of the present invention, however, by following the embodiment of the process illustrated by FIG. 2.

Before proceeding with the separation, it is necessary to select a solid adsorption medium and to choose appropriate buffer solutions for each stage. These buffer solutions are determined from the elution data of a conventional chromatographic column packed with the same solid medium. After determining a first buffer solution that promotes adsorption of the feed solution by the selected solid medium, a column operator will locate three running conditions that can separate the mixture of biomolecules into three major parts, by selectively desorbing the first group impurities $B_1$, the desired component A, and the second group impurities $B_2$. Once the operating conitions have been determined by use of a conventional chromatographic column, the method of the invention can be followed.

Figure 2:
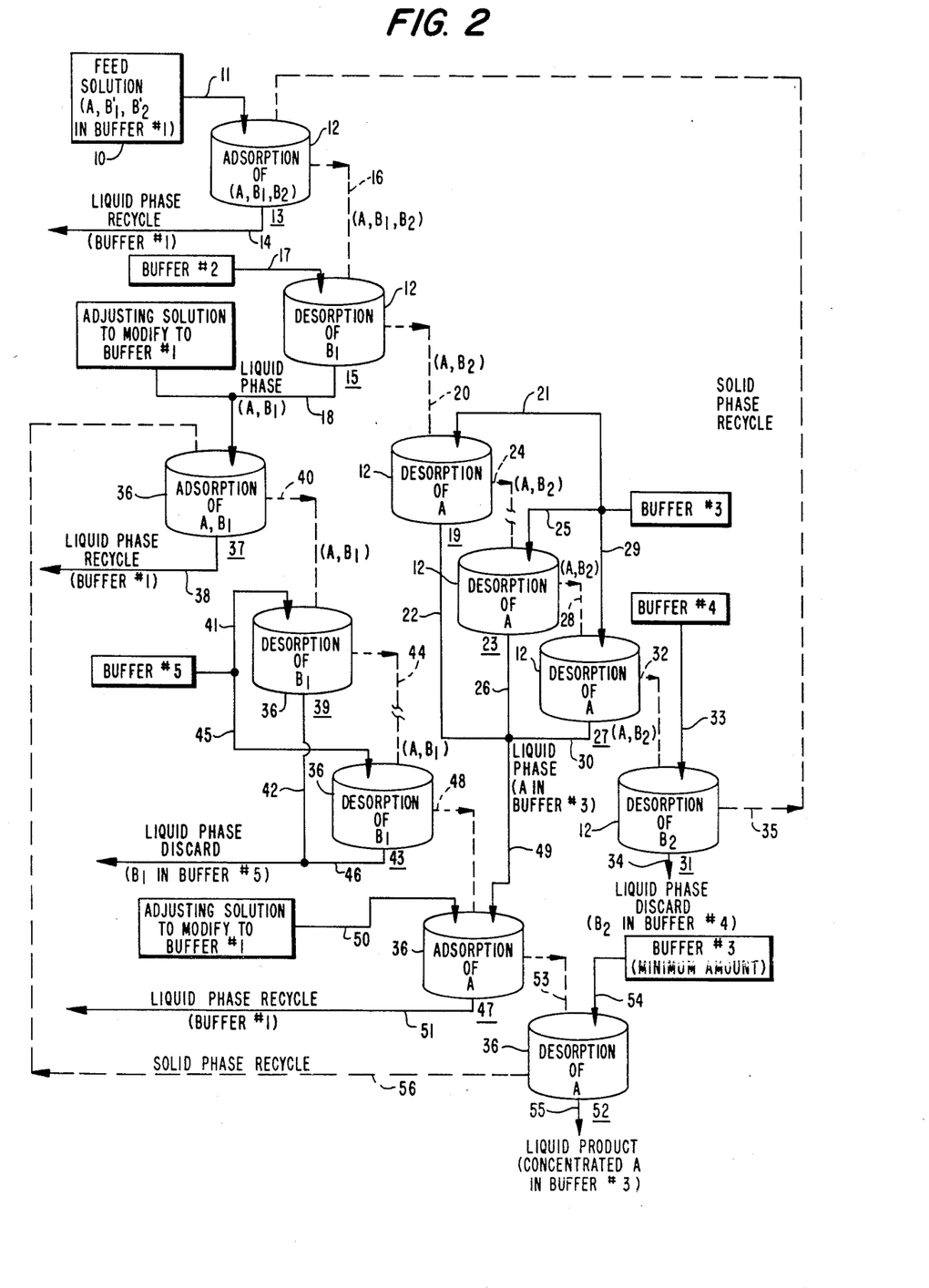
FIG. 2 is a flow block diagram of a sequence of process steps according to the invention for separating the desired component A from a mixture as represented by FIG. 1.

With reference to FIG. 2, a feed solution containing components A, $B_1$, and $B_2$ in a first buffer solution (Buffer #1) is mixed in a fist step 10 with a preselected amount of a particulate adsorbent medium. Buffer #1 has been preselected to facilitate absorption of the feed components by the particulate medium or solid phase, as will be described in detail in connection with the illustrative examples. After thorough mixing, the liquid feed and solid phase are delivered via a line 11 to a container 12 located at a first station 13. The liquid Buffer #1 is then drained from the container via line 14 and recycled for mixing with more feed stock, while the solid phase is retained in the container. As will be explained in connection with FIG. 5, this step may be accomplished by providing the bottom of the container with an outlet opening and covering the outlet opening with a porous layer. The pore size of the porous layer should be smaller than the particle size of the absorbent medium.

After the liquid buffer solution has been drained, the container is moved from the first station to a second station 15, as indicated by the dashed line 16. At the second station, a Buffer #2 solution is delivered to the container via line 17. Buffer #2 has been predetermined to selectively desorb the $B_1$ component from the particulate adsorbent medium, by a procedure that will be described below. The liquid buffer solution containing the desorbed impurity $B_1$ then drains from the container via line 18.

Because of the overlapping separation characteristics of the components in the feed mixture, however, a significant amount of the desired component A will be desorbed at the second station and will be entrained in the effluent drained through line 18. This portion of component A is recovered in a second circuit to be described later. Meanwhile, the container with the solid phase, which retains the major portion of component A as well as the impurity $B_2$, is moved to a third station 19, as indicated by the dashed line 20.

At station 19 the container receives via line 21 a preselected amount of a third buffer solution, Buffer #3, which has been predetermined to selectively desorb the desired component A. This buffer solution, after percolating through the solid phase in the container and picking up some portion of the adsorbed component A, drains from the container via line 22. The container then moves to a fourth station 23, as indicated by dashed line 24, where it receives a further amount of Buffer #3 via line 25. This second dose of Buffer #3 then drains from the container via line 26 with an additional amount of desorbed component A before the container moves to a fifth station 27, as indicated by dashed line 28. Still a third amount of Buffer #3 is delivered via line 29 to the container at the fifth station to elute any remaining amount of component A from the solid phase and to drain it from the container via line 30.

After the final desorption of component A, the container moves to a sixth station 31, as indicated by dashed line 32. At this station a fourth buffer solution, Buffer #4, is delivered to the container via line 33. This fourth buffer solution has been predetermined to selectively desorb the second impurity $B_2$ from the particulate adsorbent medium. The buffer solution then drains from the container via line 34, carrying the desorbed component $B_2$ to a liquid phase discard. The solid phase left in the container may then be removed by any suitable technique for recycling to the mixing step 10, and the container is returned to station 13, as indicated by dashed line 35.

It should be understood that the depiction of the desorption of each of the impurity groups $B_1$ and $B_2$ at a single station and the desorption of the desired component A at three successive stations is for illustrative purposes only. Typically, each desorption operation will be repeated a number of times (for example, ten times) for most effective removal of the given component from the adsorption medium. It should also be understood that the above-described cycle for a single container 12, illustrates a process that is most efficiently applied to a plurality of containers in an endless line. As the first container moves from the first station to the second station, a second container, recycled from the final station, moves to the first station, and so on. In this way, each operation at each station is performed for each successive move of the containers.

As indicated earlier, the liquid phase, containing impurity $B_1$ and a small amount of A, that was drained from the container at the second station of the primary circuit is modified to Buffer #1 and is delivered to a similar container 36 located at an initial station 37 in a secondary processing circuit. Container 36 holds a predetermined amount of the same particulate medium, which adsorbs the A and $B_1$ components as the liquid percolates through the container. The Buffer #1 liquid phase then drains from the container 36 via line 38 and is recycled.

Container 36 then moves to a next station 39, as indicated by dashed line 40. At this station a predetermined amount of a Buffer #5 is added via line 41. This buffer solution has been predetermined to selectively desorb impurity $B_1$ while leaving all but an insignificant fraction of the adsorbed component A. The desorbed impurity $B_1$ is drained from the container in the liquid Buffer #5 phase via line 42 to a liquid phase discard, and the container moves to a further station 43, as indicated by dashed line 44, where additional $B_1$ is desorbed by more Buffer #5 delivered via line 45. The additional desorbed $B_1$ in the buffer solution drains via line 46 to the liquid phase discard.

Following desorption of all the impurity $B_1$, the solid phase in container 36 retains only the component A that was adsorbed at station 37. The container is then moved to a next station 47, as indicated by dashed line 48. At this next station, the major amount of component A in Buffer #3 that was drained from container 12 at stations 19, 23, and 27 in the primary circuit is delivered via line 49, together with an amount of an adjusting solution via line 50 to modify the resulting solution to Buffer #1 characteristics. This causes the component A in the stream from the primary circuit to be adsorbed also by the solid phase as the solution passes through container 36. Buffer #1 drained from the container via line 51 then is recycled, and the container moves to a final station 52, as indicated by dashed line 53.

A minimum amount of Buffer #3 necessary for desorbing the component A from the solid phase is delivered to the container at station 52 via line 54 and drains from the container via line 55 after eluting the component A from the solid phase. This constitutes the liquid product (component A concentrated in Buffer #3) of the system. The container with retaining solid phase is then recycled to the initial station 37, as is indicated by dashed line 56. Just as in the primary circuit, it should be understood that each desorption operation in the secondary circuit may be repeated many times, as necessary to desorb all but insignificant amounts of the respective component. Also, it is preferable in this circuit as well to use a plurality of containers in an endless recirculating line.

As stated before, the method embodiment of FIG. 2 is designed for processing a feed mixture in which the elution curves of $B_1$ and $B_2$ overlap the curve of the desired component A.

Figure 3:
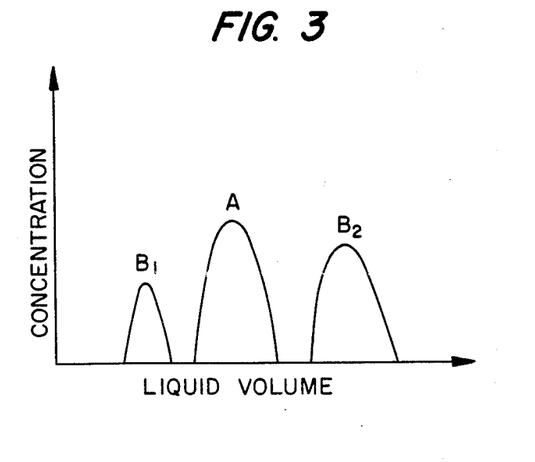
FIG. 3 is a chromatographic elution diagram for a biomolecular mixture in which there is a clear cut between desired component A and two groups of impurities $B_1$ and $B_2$.

It is preferred to have a clearly defined elution pattern close to that shown in FIG. 3. The overlapping elution pattern shown in FIG. 1 can be modififed to the FIG. 3 elution pattern by optimizing the liquid phase, such as by adjusting pH, ionic strength, polarity and solubility, or even the buffer system and solid phase for adsorption-desorption.

Figure 4:
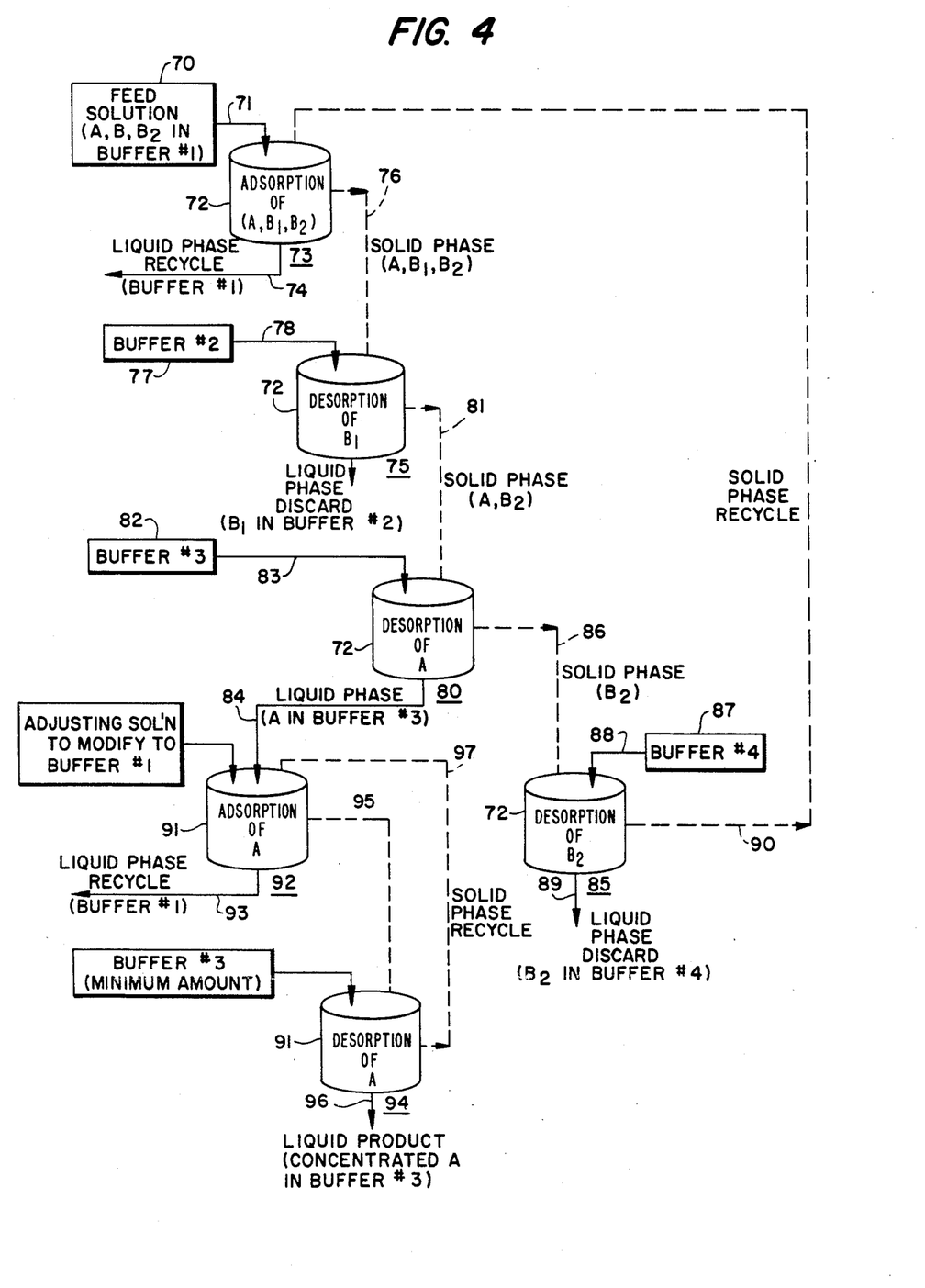
FIG. 4 is a flow block diagram of an alternative simplified sequence of process steps according to the invention for separating the desired component from a mixture as represented by FIG. 3.

With a clear-cut elution pattern as shown in FIG. 3, it is possible to simplify the operational protocol of the invention to the procedure illustrated schematically in FIG. 4. As in the more general case illustrated by FIG. 2, feed solution containing a mixture of components A, $B_1$, and $B_2$ in a Buffer #1 solution flows from a reservoir 70 through a line 71 to a container 72 located at a first station 73. The container carries a predetermined amount of the same granular adsorbent material as composed the solid phase in the embodiment of FIG. 2. As the mixture percolates through the solid phase, the components A, $B_1$, and $B_2$ are adsorbed, and the liquid Buffer #1 passes through a porous layer covering an outlet opening at the bottom of the container into a discharge line 74 for recycling to the feed reservoir. The container 72 then moves to the next station 75 via a path indicated by dashed line 76.

At station 75, a measured quantity of Buffer #2 flows into the container from a reservoir 77 via line 78. Buffer #2 seeps through the solid phase in the container and desorbs the $B_1$ component, leaving the components A and $B_2$ still adsorbed on the particles of solid material. The Buffer #2 solution carrying the desorbed component $B_1$ drains from the container through a discharge line 79. After removal of the liquid phase, the container moves on, carrying the solid phase with the retained A and $B_2$ components to a third station 80 via pathway 81.

Here a preselected quantity of Buffer #3 flows from a reservoir 82 via line 83 to the container, where it selectively desorbs the desired component A from the solid phase and emerges as a dilute stream of A dissolved in Buffer #3. This stream is delivered through line 84 for further processing in a separate circuit that will be described further below. The container then transports the solid phase, with the impurity $B_2$ as the remaining adsorbed component, to a fourth station 85 via dashed-line path 86.

The remaining absorbed impurity $B_2$ is stripped from the solid phase in the container at the fourth station by adding the appropriate amount of Buffer #4 from a reservoir 87 through line 88 and then draining the buffer and dissolved component $B_2$ from the container via discharge line 89. The container with the stripped solid phase is then returned to the first station, as indicated by the dashed path line 90, to repeat the cycle.

Meanwhile, the liquid phase containing a dilute solution of component A in Buffer #3 flows through line 84 to another container 91 located at an initial station 92 of a separate two-stage circuit. Also delivered to container 91 at this station is an adjusting buffer solution in proper amount to obtain a modified liquid phase corresponding to Buffer #1 characteristics. This causes the dissolved component A to be adsorbed by a charge of solid adsorbent material in the second container, while the Buffer #1 liquid phase drains from the container through line 93 for recycling.

Container 91 then moves to a second station 94 along dashed path 95 to receive a predetermined minimum amount of Buffer #3 necessary to desorb all of the adsorbed A component, which drains from the container through a concentrated product delivery line 96. The container 91 then returns to the initial station 92 via dashed-line path 97 to repeat the cycle.

As explained in the case of FIG. 2, each station in this simplified diagram may represent a multiplicity of stations, and the single container illustrated for each circuit represents an endless series of containers corresponding to at least the total number of stations. In addition, the several buffer solutions may be delivered in progressively changing concentrations to successive individual stations in each group to provide a gradient elution process that is more effective than using buffer solution of constant characteristics at each station.

Figure 5:
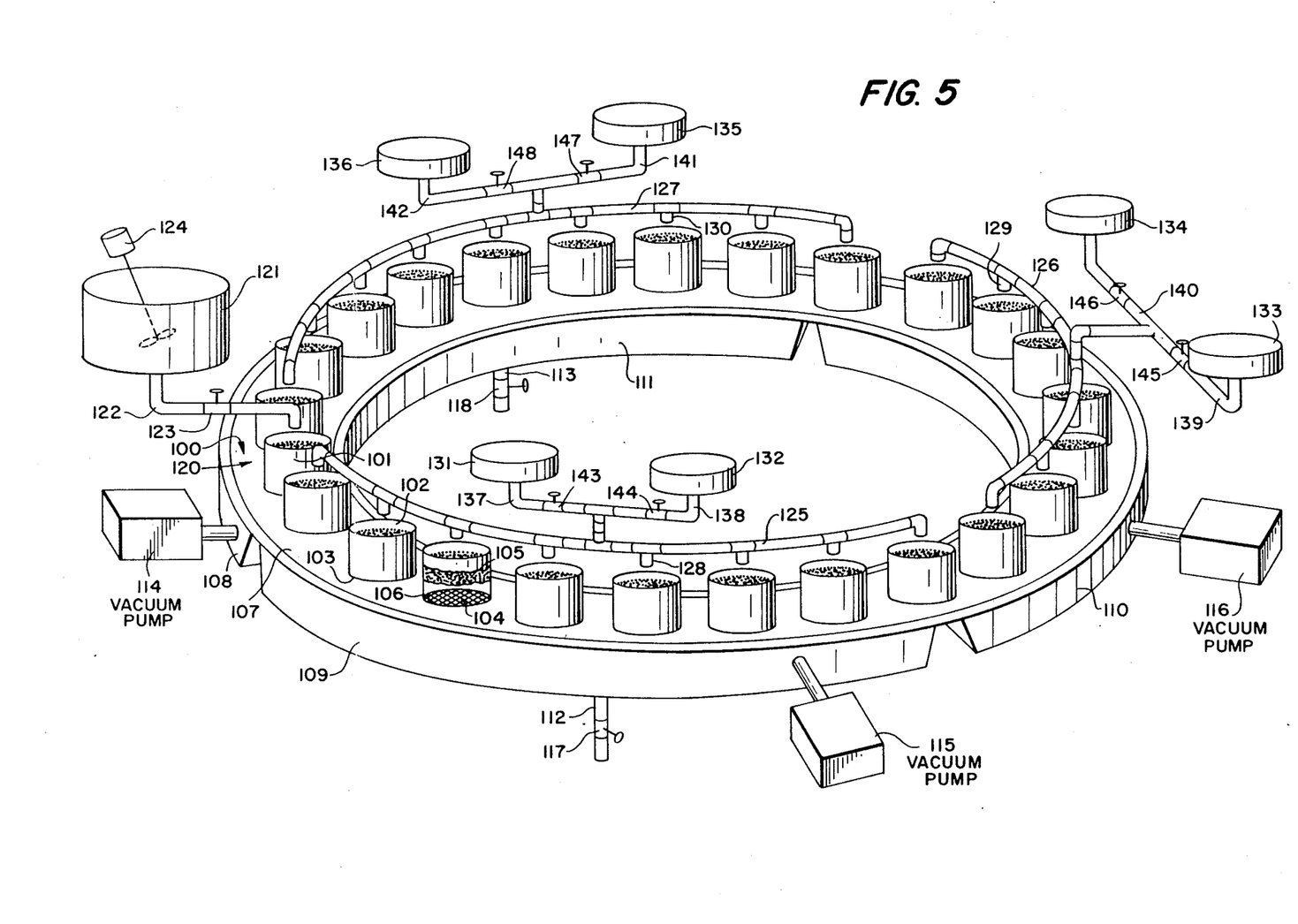
FIG. 5 is a generally schematic perspective view of a preferred apparatus according to the invention.

FIG. 5 illustrates semi-schematically a presently preferred embodiment of an apparatus for performing the method of the invention as described in connection with FIGS. 1-4. The principal feature of the apparatus is an endless conveyor 100 that carries a number of identical and equally spaced containers 101 in a circular path. Each container 101 has an open top 102 and an open bottom 103. The bottom is covered by a filter 104 comprising a porous layer, the pores of which are small enough to prevent passage of particles of a granular adsorbent material 105 filling each container.

The adsorbent material 105 may be any material conventionally used for selectively separating dissolved components from a liquid mixture by succesive adsorption and desorption steps. Typically, these materials are resins provided in the form of spherical beads, as described earlier.

Each filter 104 may be a fine screen secured to the bottom of the corresponding container, or it could be a screen or other porous layer covering a mating opening 106 in the top 107 of the conveyor. The conveyor top 107 is preferably formed as a unitary flat annular sheet of metal, such as stainless steel, or other impervious material and is driven in a circular path about its own axis by conventional drive means (not shown, to simplify the drawing). For example, the conveyor top could be connected by spokes to a central motor-driven drive shaft, or it could be supported by rollers and carry a rack or sprocket chain driven by a motor-operated gear arrangement.

In the illustrated embodiment, four arcuate segmental trough-like chambers 108, 109, 110, and 111 enclose the under surface of the conveyor top. The chambers divide the apparatus into a number of processing sections equal to the number of chambers, with each section being dedicated to a specific adsorbing or desorbing step. Each chamber collects the liquid phase effluent from the containers at the stations located in its section, the effluent being discharged for appropriate further processing through respective drain lines, of which only line 112 from chamber 109 and line 113 from chamber 111 are shown. Preferably, the chambers also serve as vacuum plenums, with a vacuum pump (only pumps 114, 115, and 116 are shown schematically) being provided for each chamber to increase the pressure head across the solid phase in each container and thus to increase the processing speed of the system. To hold the vacuum in the plenum while the liquid phase is percolating through the adsorbent medium at each station, the drive line for each chamber has a shutoff valve (valves 117 and 118 are shown in lines 112 and 113, respectively).

The conveyor is arranged with a first or initial station 120 located above chamber 108, shown at the left side of the drawing. The section defined by this chamber has only one station, and the container at this station receives a feed solution from a reservoir 121 through a feed line 122 that is provided with a control valve 123. The feed solution is a mixture of a desired component and groups of impurities obtained from a preliminary process in an appropriate buffer liquid for causing the several components of the mixture to be adsorbed by the solid phase material 105 in the container. A mixer 124 will be used advantageously to keep the feed mixture well stirred.

The remaining three sections defined by chambers 109, 110, and 111, respectively, have eight stations each in the illustrated embodiment. This number is chosen merely for convenient illustration, however. The number of stations per section can be any desired value, depending on the intended production rate for the machine and the characteristics of the particular components being separated. It is also not necessary to have an equal number of sections in each of those sections.

Above each of the multistation sections is a buffer distribution assembly that includes a manifold 125, 126, 127 provided with a plurality of spouts 128, 129, 130 for delivering liquid to a container at each station and connected to a pair of reservoirs 131, 132; 133, 134; and 135, 136, respectively. Each pair of reservoirs can provide liquid to the corresponding manifold through lines 137, 138; 139, 140; and 141, 142 equipped with metering valves 143, 144; 145, 146; and 147, 148, respectively. The purpose of the dual reservoirs for each section will be explained in the following general description of the operation of the apparatus.

Before conducting a separation process with the apparatus of FIG. 5, it is first necessary to select a suitable adsorbent medium and to predetermine the buffer characteristics and amounts for optimum results at each stage. This can be done using a laboratory scale column and conventional chromatographic techniques, and specific examples are presented below.

Starting at the initial station 120 with the arrival of a container filled with fresh adsorbent medium, a metered amount of feed material mixed with a buffer predetermined to cause adsorption of the feed material by the adsorbent medium is delivered from mixing tank 121. The predetermined amount of liquid phase can be metered in any conventional way, but use of a preset timer to control the opening period of valve 123 is probably the simplest. Since all of the steps performed by the apparatus are amenable to timer control, the apparatus can be easily arranged to perform the steps both simultaneously and sequentially in accordance with the requirements of the process.

After delivery of the liquid feed to the container at the first station, the vacuum pump 114 is started in order to partially evacuate the receiving chamber 108 beneath the container. The differential pressure created across the container significantly reduces the time for the feed solution to percolate through the adsorbent solid phase. Since adsorption occurs essentially upon contact, it is desirable to complete the passage of the solution through the container as quickly as possible, to minimize the processing time per station.

Once the liquid phase has passed completely from the container, the vacuum is released from chamber 108 and the liquid accumulated in the chamber is drained by opening a drain valve (not shown). Then the conveyor drive is energized to move the container one station forward. This brings the container to the first station of the first desorption section defined by the chamber 109, and a following container into position at the initial station 120. The above-described procedure is repeated at the original station, while a second predetermined amount of liquid buffer is delivered to the original container from the tanks 131 and 132 of the buffer distribution assembly of the first desorption section. Two buffer tanks are used to permit adjustment of the buffer characteristics to achieve optimum results. In the usual case, the optimum buffer characteristic (for example, concentration) will occur within a range of values. By filling tank 131 with a buffer solution at one end of the range and tank 132 with a buffer solution at the other end of the range, it is possible to adjust the solution delivered to each station in the section to any characteristic within the range by proportioning the flow from the two tanks through adjustable valves 143 and 144. A predetermined amount of buffer is delivered to the container at the first station of this section by a timed opening of a valve (not shown) provided in the spout 128 positioned above that station. Then a partial vacuum is drawn in chamber 109 by energizing vacuum pump 115 until the liquid buffer phase has passed through the adsorbent bed and collected in the chamber. The vacuum is then released from chambers 108 and 109, the accumulated liquid is drained from both chambers, and the conveyor drive energized to move the containers to the next stations.

The cycles of liquid fill, apply vacuum, release vacuum, drain, and shift one station are repeated so that each container moves stepwise through each station of each section. Since the time spent at every station is the same, this time is controlled by the operation that takes the longest time at any of the stations. It is desirable, therefore, to adjust the flow rates so that the necessary processing times at each station are all the same.

In each section, another component is desorbed from the solid phase by a different buffer, as was explained above in connection with FIGS. 1-4. The adsorbent medium in the container leaving the final station of the third section, therefore, is fully stripped and ready to start the process all over again. The liquid drained from the initial chamber is essentially pure buffer; so it can be returned to the mixing tank in proper proportion to the addition of new feed material. The spent liquid phase from the other sections contains desorbed components, as described earlier. The buffer containing the desired component is saved as a product stream. The buffers containing the undesired components can be discarded or further processed, if desired. Although the buffer distribution assemblies of the illustrated embodiment permit adjustment of the buffer used in each section, the same buffer is necessarily delivered to all stations in a given section because delivery is simultaneous to all the stations. In many applications, more effective separation is possible by using gradient elution. The apparatus can easily be changed to provide stepwise changes of buffer characteristics across the desired range for each section by substituting individual reservoirs at each station for the two reservoirs per assembly. Each reservoir will contain a unique buffer that differs progressively through the section from one end of the range to the other.

The techniques for choosing the solid phase material and the buffers are essentially similar to the techniques used in conventional single-column chromatography. Following are several illustrative examples, in which the solid phase material is an ion exchange resin. This equipment and process is equally adapted for use with affinity-type resins and, in fact, with any medium that has the necessary selective adsorbing and desorbing characteristics.

Example I

In this example, the crude enzyme solution used to demonstrate the production scale process of the invention is alkaline phosphatase, which was partially purified from the human placenta with 2.6 units per mg protein. The crude feed enzyme was prepared as 0.03 wt % in 0.1M, pH 7.4 Tris-HCl buffer solution. The solid phase used for the process was DEAE-Sepharose CL-6B cation exchanger with particle size 40-160 um. This was first washed three times with 1M NaCl solution, and subsequently three times with 0.1M Tris-HCl (pH 7.4) buffer solution.

The optimal amount of resin is determined by gradually adding the resin into a known volume of 0.03 wt % feed solution and measuring the concentration for both enzyme activity and impurity after 1 minute of thorough mixing. When the protein concentration in solution drops to zero, the least amount of resin needed for the process is obtained. For large production scale design, an safety factor of 1.5 was chosen. The amount of resin needed for the projected treating volume can be determined by linear proportion. For this specific case, the optimal amount of wet base resin is 1.8 g for 200 cc of 0.03 wt % solution.

Example II

As in example I, the determination of the optimal buffer concentration was chosen from the elution profile data of an HPLC or low pressure chromatographic column packed with the same ion exchange resin. Thus, the elution profile of chloride ion concentration, the counter ion for a cation exchanger, was recorded corresponding to the protein elution. Three buffer concentrations were picked up and used as the design guideline for this invention. After the optimal buffer concentrations were chosen, the process was first demonstrated as a batch process, then the continuous process was designed based on the batch process. Initially, the resin was mixed with 200 cc of 0.1M, pH 7.4 Tris-HCl feed in which the proteins in solution were adsorbed on the solid phase; subsequently, the solid and liquid phases were easily separated by filtration. Then, 200 cc of 0.19M Tris-HCl buffer (pH 7.4) was added and mixed with the resin. The first part of impurities returned to the solution phase, and the mixture was filtered to separate the liquid and solid phases. Then, 200 cc of 0.25M Tris-HCl buffer (pH 7.4) was added and mixed for one minute, so that only enzyme return to the liquid phase. The amount of buffer can be varied to obtain various concentrations of desired enzyme activity per unit volume of solution. Then, 200 cc of 1.0M Tris-HCl buffer (pH 7.4) was mixed with the resin, and all the unretained proteins were washed off. Actually, the volume of 1.0M buffer was reduced in that the collected liquid was diluted with water to a final concentration of 0.1M as a recovery stream. The data of this example are listed in Table 1.

TABLE 1

| Buffer Concentration | 0.1 M | 0.19 M | 0.25 M | 1.0 M |
|---|---|---|---|---|
| 405 | 0.019 | 0.15 | 0.368 | 0.454 |
| 595 | 0 | 0.076 | 0.029 | 0.532 |
| Volume | 200 cc | 200 cc | 200 cc | 200 cc | where:

$405 = \dfrac{\text{enzyme activity of sample}}{\text{enzyme activity of feed}}$ $595 = \dfrac{\text{total protein of sample}}{\text{total protein of feed}}$ The buffer of 0.25M will recover 36.8% of pure enzyme. The waste stream of 0.19M and 1.0M can be diluted with water to a final concentration of 0.1M as the recovery stream for the process. Note that the 405 and 595 are initially at one.

Example III

Similar procedures as example II, but 0.18M and 0.27M buffers were substituted for 0.19M and 0.25M. The buffer of 0.27M increased the recovery of enzyme, and the 0.18M buffer lowered the enzyme concentration in the recovery stream.

TABLE 2

| | Buffer Concentration | | | |
|---|---|---|---|---|
| | 0.1 M | 0.18 M | 0.27 M | 1.0 M |
| 405 | 0.026 | 0.14 | 0.40 | 0.491 |
| 595 | 0.023 | 0.087 | 0.07 | 0.564 |
| Volume | 200 cc | 200 cc | 200 cc | 200 cc |

The recovery of pure enzyme by the 0.27M buffer increased to 40%.

Example IV

As in Example I, the enzyme feed was prepared as 0.03 wt % at ionic strength 0.18M (pH 7.4). The resin was added to the 200 cc of feed solution and mixed for one minute. After filtration, the solid was then mixed with 100 cc of 0.25M Tris-HCl (pH 7.4) and filtered to recover the pure enzyme in a concentrated solution. Then, 100 cc of 1.0M Tris-HCl buffer (pH 7.4) was mixed with the resin and filtered. The filtrate liquid then was diluted with water to 0.18M as a recovery stream. Note that the 0.1M buffer was omitted. The data are listed in Table 3. The enzyme was 45.3% recovered as pure form.

TABLE 3

| | Buffer Concentration | | |
|---|---|---|---|
| | 0.18 M | 0.25 M | 1.0 M |
| 405 | 0.143 | 0.453 | 0.918 |
| 545 | 0.196 | 0.13 | 1.08 |
| Volume | 200 cc | 100 cc | 100 cc |

Example V

According to the standard procedures shown in FIG. 2, first, 200 cc of 0.03 wt % feed solution at 0.1M, pH 7.4 Tris-HCl buffer was mixed with a sufficient amount of resin to adsorb all proteins. Then, the solution was filtered to separate the solid and liquid phases. The solid phase then was mixed with 100 cc of 0.18M buffer. After a second filtration, the collected solution was stored for further treatment as recovery stream 1. The pure enzyme was obtained by mixing the resin and filtrate eight times each with 25 cc of 0.25M buffer. The collected solution was identified as product 1. The remaining resin was finally mixed with 200 cc of 1.0M buffer to elute the remaining proteins and filtered, the filtrate solution being treated as a recovery stream 2.

The recovery stream 1 was diluted with water and adjusted to initial conditions and adsorbed by the resin, then filtered. The remaining solid phase was washed 4 times, each time with 25 cc of 0.16M buffer; the collected solution was discarded. Finally, the resin was mixed with 100 cc of 0.4M buffer, and the filtrate was collected as product 2.

The recovery stream 2 was diluted with water to initial conditions and washed 5 times, each time with 20 cc of 0.27M buffer. The collected solution was product 3. The resin was treated with 100 cc of 1.0M buffer and the solution discarded. The fresh resin was then returned to the process for reuse. The total amount of product 1, 2, and 3 have total pure enzyme recovery of 63%. Table 4 shows the experimental data.

TABLE 4

| | Buffer Concentratn. | | | | | | |
|---|---|---|---|---|---|---|---|
| | 0.1 M | 0.18 M | 0.25 M | 0.25 M | 0.25 M | 0.25 M | 0.25 M |
| 405 | 0 | 0.258 | 1.19 | 1.09 | 0.687 | 0.453 | 0.286 |
| 595 | 0 | 0.188 | 0.341 | 0.313 | 0.227 | 0.17 | 0.097 |
| vol. | 200 cc | 100 cc | 25 cc | 25 cc | 25 cc | 25 cc | 25 cc | recovery stream 1

| | Buffer Conc. | |
|---|---|---|
| | 0.10 M | 0.4 M |
| 405 | 0.03 | 0.16 |
| 595 | 0.08 | 0.11 |
| vol. | 100 | 100 cc |

Example VI

The diffrnece between this example and example V is that the first impurity $B_1$ was taken out first, then the enzyme and the second impurity $B_2$. The first impurity $B_1$ was washed eight times with 25 cc of a 0.16M buffer and the enzyme was washed four times with 25 cc of 0.27M and 6 times with 25 cc of 0.25M buffer. The experimental results showed results similar to those of example V and had a total enzyme recovery of 55.6%. The experimental data are shown in Table 5.

TABLE 5

| | Buffer Concentration | | | |
|---|---|---|---|---|
| | 0.10 M | 0.16 M | 0.25 M & 0.27 M | 1.0 M |
| 405 | 0.016 | 0.124 | 0.446 | 0.401 |
| 595 | 0.065 | 0.095 | 0.178 | 0.40 |
| volume | | 200 cc | 200 cc | 250 cc | 200 cc |

Example VII

The process of the invention can also be extended to use with an affinity resin that has specific adsorption for the protein. In this example, the separation of Concanavalin A (Con A) from Hemoglobin (Hm) was achieved via the resin Sephadex B-150 that specifically adsorbs only the Con A. The feed solution was prepared as 0.03 wt % Con A and 0.01 wt % Hm in 0.05M phosphate buffer solution. Initially, 200 cc of feed solution was mixed with the resin, which adsorbed only Con A, with the Hm remaining in solution. The mixed solution was then filtered to obtain the primary separation between Hm and Con A. The remaining solid phase was washed twice with a solution containing 0.15M D-glucose in 0.05M phosphate buffer.

Totally, two products have been collected. These are Hm, with 92.4% recovery, and Con A, with 84.2% recovery. The separation factor achieved between the two proteins was 45 as compared with the initial value of one. The purity of Con A was over 98% as close to pure form. The experimental results are listed in Table 6.

TABLE 6

| Feed | only 0.03 wt % Con A | 0.01 wt % Hm & 0.03 wt % Con A | Reference |
|---|---|---|---|
| 403 | 0.010 | 0.556 | 0.00 |
| 595 | 0.486 | 0.642 | 0.4035 |
| Hm + Con A | 1st Product | 2nd Product | |
| 403 | 0.451 | 0.125 | |
| 595 | 0.542 | 0.428 | |
| volume | 196 cc | 100 cc | |
| Hm + Con A | 3rd Product | 4th Product | |
| 403 | 0.010 | 0.006 | |
| 595 | 0.469 | 0.4115 | |
| volume | 100 cc | 100 cc | |

Note:
403 is the wave length used for measuring the Hm and Con A. 595 is the wave length used for measuring the total protein of Hm and Con A.

I claim:

1. A method for separating a desired component from a feed solution containing a plurality of components by selective adsorption on and desorption from granular adsorbent particles, the method comprising:

(a) providing a multiplicity of identical containers at a corresponding multiplicity of stations in an endless line, each container having an equal predetermined amount of said granular adsorbent particles, said multiplicity of stations being subdivided into at least a first zone having at least a first station, a second zone having at least a first and second station, and a third zone having at least a first station;

(b) mixing an amount of said feed solution with a first buffer solution having a predetermined capability for promoting adsorption of the components in the feed solution by the granular particles;

(c) delivering an amount of the mixture to a first container containing the predetermined amount of granular adsorbent particles and located at the first station in the first zone, the amount of the delivered mixture being predetermined such that substantially all of the desired component as well as at least part of the other components in the mixture will be adsorbed by the predetermined amount of granular particles;

(d) draining the remainder of the mixture of feed solution and first buffer solution from the container while retaining the granular adsorbent particles in the container;

(e) simultaneously moving the multiplicity of containers such that the first container moves to the first station in the second zone;

(f) delivering a predetermined amount of a second buffer solution to the container at the first station in the second zone, the second buffer solution having a predetermined capability for selectively desorbing the desired one of the at least two adsorbed components from the granular particles and simultaneously repeating step (c) with respect to the container that has moved to the first station in the first zone;

(g) draining the second buffer solution containing a desorbed portion of the desired component from the container at the first station of the second zone while retaining the granular adsorbent particles in the container;

(h) saving the drained second buffer solution containing the desired component as a product stream; and (i) simultaneously moving the multiplicity of containers such that the first container moves to the second station in the second zone;

(j) delivering a predetermined amount of the second buffer solution to the container at the second station in the second zone and simultaneously repeating step (f) with respect to the containers that have moved to the preceding stations;

(k) draining and saving as a product stream the second buffer solution containing a further amount of the desired component from the container at the second station of the second zone, and simultaneously repeating steps (d), (g), and (h) with respect to the containers at the preceding stations;

(l) simultaneously moving the multiplicity of containers such that the first container moves to the first station of the third zone;

(m) delivering a predetermined amount of a third buffer solution to the container at the first station in the third zone, the third buffer solution having a predetermined capability for desorbing at least one of the other adsorbed components of the feed solution from the adsorbent particles and simultaneously repeating step (j) with respect to the containers that have moved to the preceding stations;

(n) draining the third buffer solution containing a desorbed portion of the other components from the container while retaining the granular adsorbent particles in the container and simultaneously repeating step (k);

(o) simultaneously moving the multiplicity of containers such that the first container moves to the first station of the first zone; and (p) repeating steps (a) through (o).

2. The method of claim 1 wherein the plurality of components are biochemical components.

3. The method of claim 1 further comprising:

delivering each successive product stream of steps (h) and (k) to successive additional containers in an endless line of containers at an endless line of corresponding stations separate from the above mentioned line of containers and stations, each additional container having a quantity of said granular adsorbing particles therein;

adding an adjusting buffer solution to modify the remainder buffer solution of the product stream to said first buffer solution to promote the adsorption of said desired component by the quantity of granular adsorbent particles;

draining the resulting first buffer solution from each additional container while retaining the granular particles in the additional container;

delivering a minimum amount of said second buffer solution to each additional container just sufficient for desorbing said desired component from the granular particles in the additional container;

draining the minimum amount of buffer solution containing the desired component from each additional container while retaining the granular particles therein; and saving said drained minimum amount of buffer solution as a concentrated product stream, the line of additional containers being moved simultaneously by one station prior to each step of delivering fluid to each container.

4. The method of claim 3 further comprising:
delivering each successive effluent portion of step (n) to successive ones of the additional containers at one of the endless line of stations separate from the first-mentioned line of containers and stations;
adding an adjusting buffer solution to modify the buffer solution of the effluent portion to said first buffer solution to promote the adsorption of any of the desired component contained in the effluent portion of step (n); and
draining the resulting buffer solution from the corresponding one of the additional containers prior to the step of delivering a minimum amount of said second buffer solution to each additional container.

5. The method of claim 1 wherein the third zone is located between the first zone and the second zone and steps (l) through (n) are performed before step (e).

6. The method of claim 1 wherein the third zone includes a second section, and the method further comprises:
after step (n), simultaneously moving the multiplicity of containers such that the first container moves to the second station of the third zone;
delivering a predetermined amount of the third buffer solution to the container at the second station of the third zone and simultaneously repeating step (m) with respect to the containers that have moved to the preceding stations; and
repeating step (n).

7. The method of claim 1 wherein the multiplicity of stations is further subdivided into an additional zone having at least a first station and located between the first zone and the second zone, the method further comprising:
after step (d) simultaneously moving the multiplicity of containers such that the first container moves to the first station of the additional zone;
delivering a predetermined amount of an additional buffer solution to the container at the first station in the additional zone, the additional buffer solution having a predetermined capability for desorbing from the adsorbent particles at least one of the other adsorbed components of the feed solution different from the component desorbed by the third buffer solution and simultaneously repeating step (j) with respect to the containers that have moved to the preceding stations;
draining the additional buffer solution containing a desorbed portion of the different other components from the container while retaining the granular adsorbent particles in the container and simultaneously repeating step (k).

8. Apparatus for separating a desired component from a solution containing a plurality of biochemical components, the apparatus comprising:
an endless conveyor;
a plurality of containers holding predetermined amounts of granular adsorbent material and arranged in equally spaced positions along the length of the conveyor, each container having an upper end with an inlet opening and a lower end with an outlet opening;
means for intermittently advancing each container on the conveyor successively through a plurality of stations having the same spacing as the spacing between the containers, the stations being subdivided into a multiplicity of zones, a first zone having at least one station, and a plurality of additional zones each having a multiplicity of stations;
a feed reservoir associated with the first zone and an additional liquid supply source associated with each of the additional zones;
means for intermittently delivering a predetermined amount of feed liquid from the feed reservoir to each container in succession at a first station in the first zone;
means for intermittently delivering a separate predetermined amount of preselected liquid material to the inlet opening of each container at each of the plurality of stations in each additional zone from the respective supply source associated with each of the additional zones simultaneously with each delivery of feed liquid to a container at the first station;
means for collecting a stream of liquid from the outlet opening of each container at each of the plurality of stations, said collecting means including means for maintaining the streams collected from the containers in one zone separate from the streams collected from the containers in the rest of the zones; and
a porous cover provided for the outlet opening of each container as the containers advance through the plurality of stations for permitting drainage of liquid through the outlet opening while retaining granular particles in the container.

9. The apparatus of claim 8 wherein the feed reservoir associated with the first station comprises a tank having an outlet opening, a stirring device installed in said tank for thoroughly mixing liquid in said tank, a conduit leading from the outlet opening of the tank to a position above the inlet opening of a container located at said first station, and valve means in said conduit for controlling flow of said mixture from the tank to the container.

10. The apparatus of claim 8 wherein the supply source for delivering a predetermined amount of preselected liquid material to the inlet opening of each container in each of the additional zones comprises at least one reservoir, a header, a conduit between the reservoir and the header for delivering a preselected liquid material from the reservoir to the header, and a multiplicity of feed pipes having inlet ends connected to the header and outlet ends positioned above the inlet openings of containers located at respective stations in the zone.

11. The apparatus of claim 8 further comprising means for applying a vacuum to the side of said porous layer facing away from the outlet openings of said containers for increasing the flow rate of liquid being drained from said containers.

12. The apparatus of claim 11 wherein the means for applying a vacuum comprises a separate plenum extending below the plurality of stations in each zone along the path of the conveyor, means for sealing between the outlet openings of the containers and the plenum in each zone, and means for partially evacuating the space inside each plenum.

* * * * *

UNITED STATES PATENT AND TRADEMARK OFFICE
CERTIFICATE OF CORRECTION

PATENT NO. : 4,758,349
DATED : 19 July 1988
INVENTOR(S) : Hsien-Chih MA

It is certified that error appears in the above-identified patent and that said Letters Patent is hereby corrected as shown below:

| Column | Line | | |
|--------|------|---|---|
| ABSTR. | 2 | : | change "biopolymer" to --biopolymers--. |
| ABSTR. | 8 | : | after "and" insert --can--. |
| 1 | 47 | : | change "partical" to --particle--. |
| 5 | 68 | : | change "fist" to --first--. |
| 6 | 2 | : | change "absorption" to --adsorption--. |
| 6 | 15 | : | change "absorbent" to --adsorbent--. |
| 8 | 50 | : | change "absorbed" to --adsorbed--. |
| 12 | 30 | : | change "an" to --a--. |

UNITED STATES PATENT AND TRADEMARK OFFICE
CERTIFICATE OF CORRECTION

PATENT NO. : 4,758,349
DATED : 19 July 1988
INVENTOR(S) : Hsien-Chih MA

It is certified that error appears in the above-identified patent and that said Letters Patent is hereby corrected as shown below:

-- Buffer

| Concentratn. | 0.1M | 0.18M | 0.25M | 0.25M | 0.25M | 0.25M | 0.25M | 0.25M | 0.25M | 0.25M | 1.0MM |
|---|---|---|---|---|---|---|---|---|---|---|---|
| 405 | 0 | 0.258 | 1.19 | 1.09 | 0.687 | 0.453 | 0.286 | 0.188 | 0.153 | 0.096 | 0.303 |
| 595 | 0 | 0.188 | 0.341 | 0.313 | 0.227 | 0.17 | 0.097 | 0.085 | 0.097 | 0.084 | 0.526 |
| vol. | 200cc | 100cc | 25cc | 25cc | 25cc | 25cc | 25cc | 25cc | 25cc | 25cc | 200cc | recovery stream 1

| Buffer Conc. | 0.10M | 0.4M |
|---|---|---|
| 405 | 0.03 | 0.16 |
| 595 | 0.08 | 0.11 |
| vol. | 100cc | 100 cc | recovery stream 2

| Buffer Conc. | 0.27M | 1.0M |
|---|---|---|
| 405 | 0.06 | 0.43 |
| 595 | 0 | 0.841 |
| vol. | 100cc | 100cc -- |

| Column | Line | | |
|---|---|---|---|
| 14 | 34 | : | change "differnece" to --difference--. |
| 14 | Table 5 | : | delete Table 5 and insert the following: |

UNITED STATES PATENT AND TRADEMARK OFFICE
CERTIFICATE OF CORRECTION

Page 3 of 3

PATENT NO. : 4,758,349
DATED : 19 July 1988
INVENTOR(S) : Hsien-Chih MA

It is certified that error appears in the above-identified patent and that said Letters Patent is hereby corrected as shown below:

-- <u>Table 5</u>

| Buffer Concentration | 0.10M | 0.16M | 0.25M & 0.27M | 1.0M |
|---|---|---|---|---|
| 405 | 0.016 | 0.124 | 0.446 | 0.401 |
| 595 | 0.065 | 0.095 | 0.178 | 0.40 |
| volume | 200cc | 200cc | 250cc | 200cc -- |

| <u>Column</u> | <u>Line</u> | |
|---|---|---|
| 15 | 36 | : before "and" delete "." and insert --,--. |

Signed and Sealed this

Seventh Day of February, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,758,349
DATED : 19 July 1988
INVENTOR(S) : Hsien-Chih MA

It is certified that error appears in the above-identified patent and that said Letters Patent is hereby corrected as shown below:

| Column | Line | | |
|---|---|---|---|
| ABSTR. | 2 | : | change "biopolymer" to --biopolymers--. |
| ABSTR. | 8 | : | after "and" insert --can--. |
| 1 | 47 | : | change "partical" to --particle--. |
| 5 | 68 | : | change "fist" to --first--. |
| 6 | 2 | : | change "absorption" to --adsorption--. |
| 6 | 15 | : | change "absorbent" to --adsorbent--. |
| 8 | 50 | : | change "absorbed" to --adsorbed--. |
| 12 | 30 | : | change "an" to --a--. |
| 14 | 34 | : | change "differnece" to -- difference --. |
| 14 | Table 5 | : | delete Table 5 and insert the following: |

UNITED STATES PATENT AND TRADEMARK OFFICE
CERTIFICATE OF CORRECTION

PATENT NO. : 4,758,349
DATED : 19 July 1988
INVENTOR(S) : Hsien-Chih MA

It is certified that error appears in the above-identified patent and that said Letters Patent is hereby corrected as shown below:

-- Table 5

| Buffer Concentration | 0.10M | 0.16M | 0.25M & 0.27M | 1.0M |
|---|---|---|---|---|
| 405 | 0.016 | 0.124 | 0.446 | 0.401 |
| 595 | 0.065 | 0.095 | 0.178 | 0.40 |
| volume | 200cc | 200cc | 250cc | 200cc -- |

| Column | Line | |
|---|---|---|
| 15 | 36 | : before "and" delete "." and insert --,--. |

This certificate supersedes Certificate of Correction issued February 7, 1989.

Signed and Sealed this

Fourteenth Day of March, 1989

Attest:

DONALD J. QUIGG

Attesting Officer  Commissioner of Patents and Trademarks